(12) United States Patent
Yeh

(10) Patent No.: US 8,363,289 B2
(45) Date of Patent: Jan. 29, 2013

(54) IMAGE READING APPARATUS HAVING TWO IMAGE SENSORS

(75) Inventor: Ming-Te Yeh, Taoyuan Hsien (TW)

(73) Assignee: Teco Image System Co., Ltd., Taoyuan Hsien (TW)

( * ) Notice: Subject to any disclaimer, the term of this patent is extended or adjusted under 35 U.S.C. 154(b) by 717 days.

(21) Appl. No.: 12/503,243

(22) Filed: Jul. 15, 2009

(65) Prior Publication Data

US 2010/0309532 A1  Dec. 9, 2010

(30) Foreign Application Priority Data

Jun. 5, 2009 (TW) .............................. 98118816 A

(51) Int. Cl.
H04N 1/04  (2006.01)
(52) U.S. Cl. ......... 358/498; 358/497; 358/496; 358/461
(58) Field of Classification Search .................. 358/498, 358/497, 496, 461, 474
See application file for complete search history.

(56) References Cited

U.S. PATENT DOCUMENTS

2006/0209336 A1*  9/2006  Nishimura .................... 358/1.15
2009/0027738 A1*  1/2009  Kim .............................. 358/474

* cited by examiner

Primary Examiner — Houshang Safaipour

(57) ABSTRACT

An image reading apparatus for use in an office machine includes a first image sensor and a second image sensor. The first image sensor is disposed in an automatic document feeder of the office machine for sensing and reading a first side of a document. The first image sensor includes a first optical module, a first correction element and an elastic sustaining element. The first optical module includes a first light source, a first light-sensing element and a glass surface. The first correction element is arranged at an opposite side of the first optical module. The elastic sustaining element has a free end sustained against the glass surface of the first optical module, thereby facilitating a close contact between the document and the glass surface. The second image sensor is disposed in an office machine main body for sensing and reading a second side of the document.

18 Claims, 4 Drawing Sheets

IMAGE READING APPARATUS HAVING TWO IMAGE SENSORS

CLAIM OF PRIORITY

This application claims priority to Taiwanese Patent Application No. 098118816 filed on Jun. 5, 2009.

FIELD OF THE INVENTION

The present invention relates to an image reading apparatus for use in an office machine, and more particularly to an image reading apparatus having two image sensors.

BACKGROUND OF THE INVENTION

With increasing industrial development, digitalized office technologies have experienced great growth and are now rapidly gaining in popularity. For example, a diversity of office machines such as copy machines, printers, fax machines and scanners are utilized to achieve various purposes. The diverse office machines, however, occupy lots of space. Nowadays, a multifunction peripheral having multiple functions in one structural unit, for example the functions of a printer, a scanner, a fax machine and/or a copy machine, is thus developed. As a consequence, the processing capability of the multifunction peripheral is increased and the operative space thereof is reduced.

For enhancing the scanning quality, before the image reading apparatus reads out data, the image reading apparatus should be corrected according to background condition and the light-sensing element. After the correction is implemented, the optical parameters of the light-sensing element will be compensated. Moreover, for increasing the scanning speed, the image reading apparatus has two image sensors to respectively scan the front and back sides of the original document. Since the light beams emitted by these two image sensors have different reflecting effects on the front and back sides of the original document and the sensing efficacy of both image sensors are different, the imaging quality is distinguished. For achieving the similar image quality, it is critical to develop a mechanism for correcting these two image sensors.

The conventional correcting method, however, still has some drawbacks. For example, if the compensated correction position is far from the real scanning position, a distortion correction problem occurs and thus the scanning quality is deteriorated. In addition, if the surface of the correction element is abraded or contaminated by the document that is transported through the transfer path, the distortion correction problem also occurs and thus the scanning quality is deteriorated.

There is a need of providing an image reading apparatus with enhanced correcting efficacy so as to obviate the drawbacks encountered from the prior art.

SUMMARY OF THE INVENTION

An object of the present invention provides an image reading apparatus having two image sensors in order to prevent distortion correction and enhance the scanning quality.

In accordance with an aspect of the present invention, there is provided an image reading apparatus for use in an office machine. The office machine includes an office machine main body and an automatic document feeder. The image reading apparatus includes a first image sensor and a second image sensor. The first image sensor is disposed in the automatic document feeder for sensing and reading a first side of a document. The first image sensor includes a first optical module, a first correction element and an elastic sustaining element. The first optical module includes a first light source, a first light-sensing element and a glass surface. The first correction element is arranged at an opposite side of the first optical module. The elastic sustaining element has a fixed end and a free end. The free end is sustained against the glass surface of the first optical module, thereby facilitating a close contact between the document and the glass surface. The second image sensor is disposed in the office machine main body for sensing and reading a second side of the document.

In accordance with another aspect of the present invention, there is provided an image sensor of an image reading apparatus of an office machine for sensing and reading a document. The image sensor includes an optical module, a correction roller and an elastic sustaining element. The optical module includes a light source, a light-sensing element and a glass surface. The correction roller is arranged at an opposite side of the optical module. The elastic sustaining element has a fixed end and a free end. The free end is sustained against the glass surface of the optical module, thereby facilitating a close contact between the document and the glass surface.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
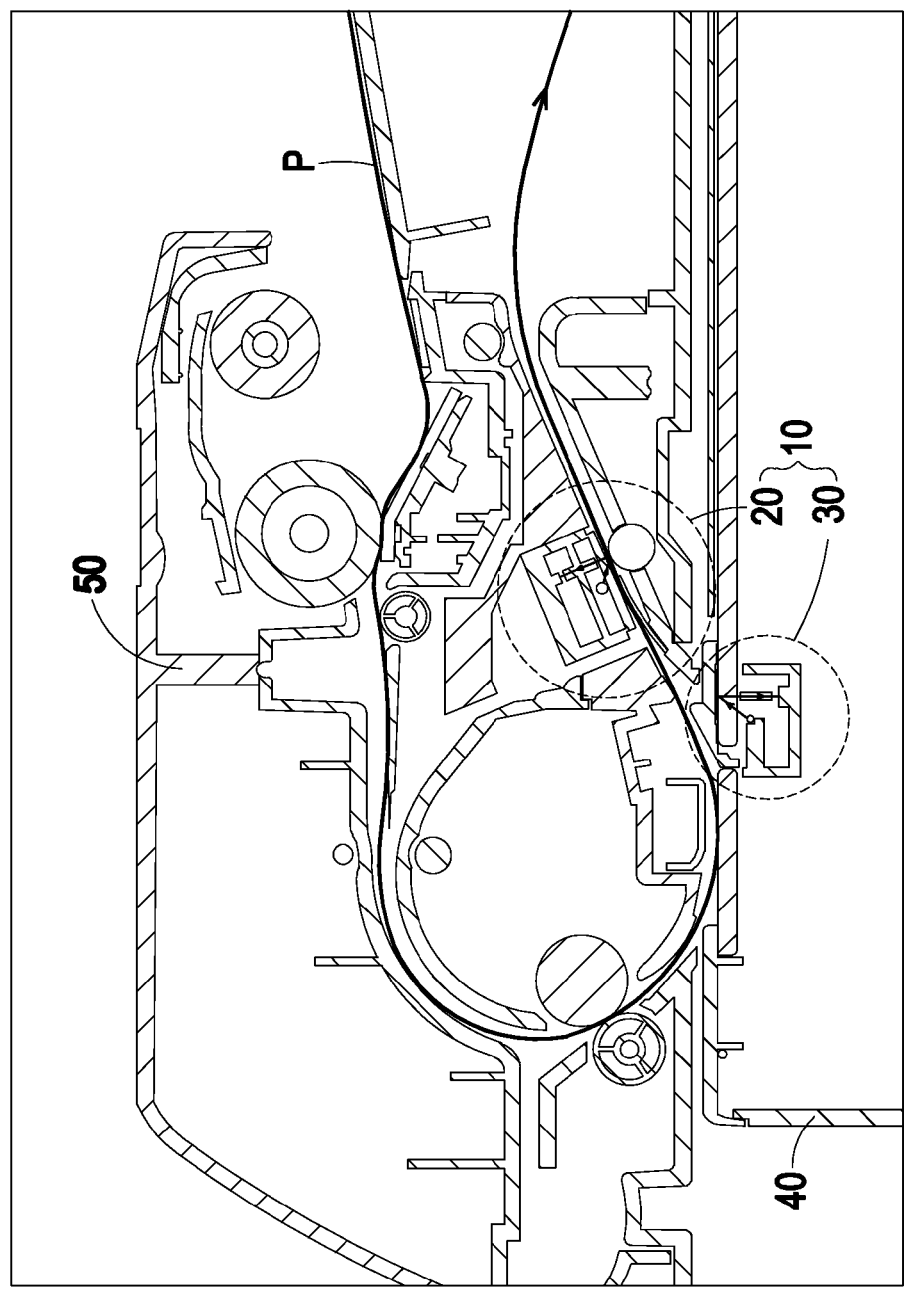
FIG. 1 is a schematic cross-sectional view illustrating an image reading apparatus having two image sensors according to an embodiment of the present invention.

FIG. 1 is a schematic cross-sectional view illustrating an image reading apparatus having two image sensors according to an embodiment of the present invention. As shown in FIG. 1, the image reading apparatus 10 is applied to an office machine 1. An example of the office machine 1 includes but is not limited to a scanner, a multifunction peripheral, or the like. The office machine 1 comprises an office machine main body 40 and an automatic document feeder 50. The original documents to be scanned are placed in a sheet input tray of the automatic document feeder 50, and then successively transported along the transfer path P.

The image reading apparatus 10 includes a first image sensor 20 and a second image sensor 30. The first image sensor 20 is disposed in the automatic document feeder 50. The second image sensor 30 is disposed in the office machine main body 40. When an original document is transported across the image reading apparatus 10 by the automatic document feeder 50, the first side and the second side of the original document are respectively sensed and read by the first image sensor 20 and the second image sensor 30. That is, the front and back sides of the original document are simultaneously read out by the image reading apparatus 10, so that the scanning speed is increased.

Figure 2:
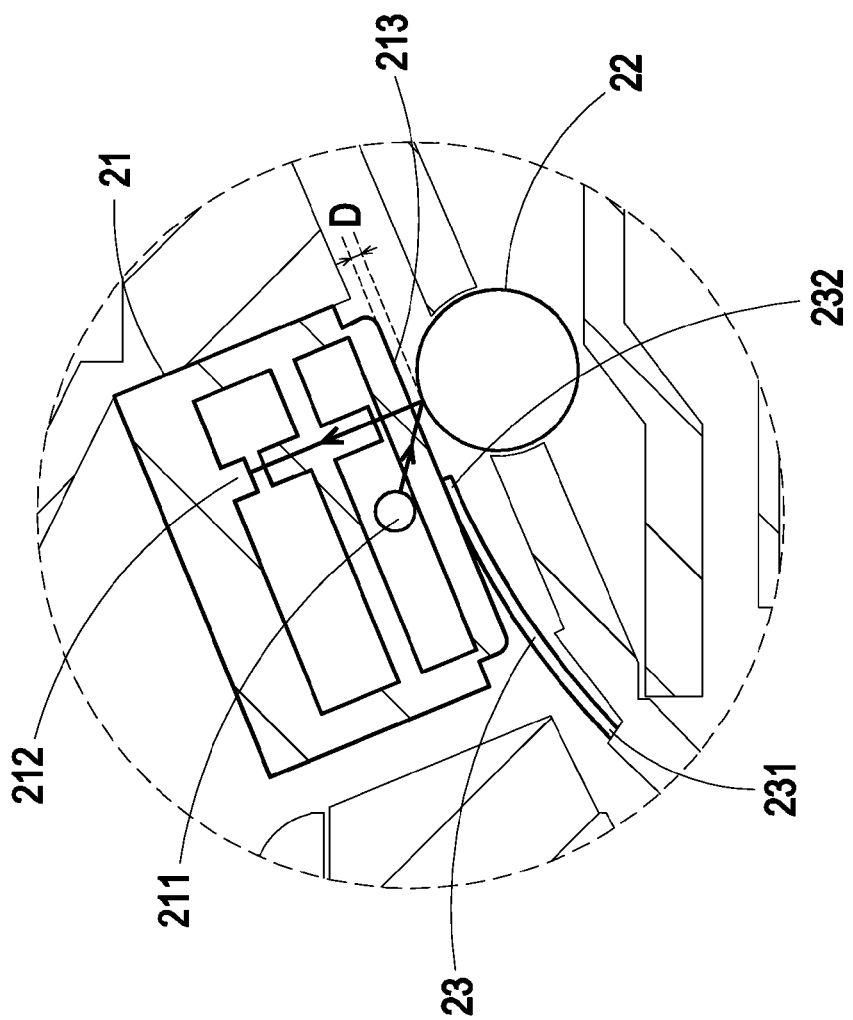
FIG. 2 is a partial enlarged view illustrating an exemplary first image sensor used in the image reading apparatus of the present invention.

FIG. 2 is a partial enlarged view illustrating an exemplary first image sensor used in the image reading apparatus of the present invention. As shown in FIG. 2, the first image sensor 20 comprises a first optical module 21, a first correction element 22 and an elastic sustaining element 23. The first optical module 21 includes a first light source 211 and a first light-sensing element 212. The first light source 211 is used for emitting a light beam required for performing the scanning operation. The light beam is successively reflected by the plural reflective mirrors (not shown) and then imaged onto the first light-sensing element 212. By the first light-sensing element 212, the optical signal of the reflective light beam is converted into a corresponding image signal. An example of the first light-sensing element 212 includes but is not limited to a contact image sensor (CIS) or a charge coupled device (CCD).

For enhancing the scanning quality, before the image reading apparatus 10 reads out data, the image reading apparatus 10 should be corrected according to background condition and the light-sensing element. The correction includes for example brightness correction, hue correction, contrast correction, and the like. After the correction is implemented, the optical parameters of the light-sensing element will be compensated. As shown in FIG. 2, the first correction element 22 of the first image sensor 20 is substantially a cylindrical roller, which is arranged at an opposite side of the first optical module 21. The light beam emitted by the first light source 211 is reflected by the first correction element 22, and then received by the first light-sensing element 212. By the first light-sensing element 212, the optical signal of the reflective light beam is processed into a standard value of an image signal. The standard value is used for compensating the color hue and brightness of the image data obtained from the scanning operation. In this embodiment, the cylindrical roller is a white cylindrical roller.

The cylindrical roller could be driven by a motive power source (not shown) to rotate. During rotation of the cylindrical roller, the light beam is projected on different locations of the cylindrical roller, so that multiple reading lines are obtained. The image data of all reading lines are averaged to obtain the standard value of the image signals in order to achieve a multi-point compensating efficacy. In some embodiments, the rotating speed of the cylindrical roller is equal to the transmitting speed of the document, thereby preventing relative friction between the document and the cylindrical roller. Since no relative friction is generated between the document and the cylindrical roller, the cylindrical roller is not scraped and the distortion correction problem is overcome. Moreover, for obtaining a good compensating efficacy of correction, the hue, brightness and surface treatment should be elaborately controller. The cylindrical roller is abrasion-resistant. Even if the cylindrical roller is contaminated, the cylindrical roller could be easily cleaned. It is preferred that the cylindrical roller is made of abrasion-resistant plastic material such as polyethylene (PE), poly(p-phenylene sulfide) (PPS), polybutylene terephthalate (PBT) or poly-oxy-methylene (POM).

As known, depending on the type of the light-sensing element, the depth of field is varied. Generally, a contact image sensor (CIS) has a shorter depth of field in comparison with a charge coupled device (CCD). That is, the application of the contact image sensor (CIS) is limited. In a case that the light-sensing element is a contact image sensor (CIS), the first correction element 22 needs to be closer to a glass surface 213 of the first optical module 21 (see FIG. 2). As shown in FIG. 2, the first correction element 22 is still separated from the glass surface 213 of the first optical module 21 by a gap D, so that the possibility of abrading or contaminating the first correction element 22 will be minimized. Since the first correction element 22 is very close to the glass surface 213, the document passing across the region between the first correction element 22 and the glass surface 213 will not be fluctuated. As such, the scanning quality is enhanced. Moreover, the elastic sustaining element 23 is used to prevent the document from abrading or contaminating the first correction element 22 and facilitate a close contact between the document and the glass surface 213, thereby enhancing the scanning quality. An example of the elastic sustaining element 23 is an elastic sheet such as a metallic elastic sheet or a plastic elastic sheet. Along the transfer path of the document, the elastic sustaining element 23 is arranged in upstream of the first correction element 22. A first end 231 (or a fixed end) of the elastic sustaining element 23 is fixed under the transfer path. A second end 232 (or a free end) of the elastic sustaining element 23 is naturally uplifted to be sustained against the glass surface 213 of the first optical module 21. Due to the elasticity of the elastic sustaining element 23, the elastic force offered by the elastic sustaining element 23 will suppress the document that is transported through the gap D between the glass surface 213 of the first optical module 21 and the first correction element 22 to be in close contact with the glass surface 213. Even if the thickness of the document is varied, the elastic force offered by the elastic sustaining element 23 is sufficient to suppress the document to be in close contact with the glass surface 213. As a consequence, the document that is transported through the gap D between the glass surface 213 of the first optical module 21 and the first correction element 22 will be kept within the depth-of-field range of the first light-sensing element 212.

Figure 3:
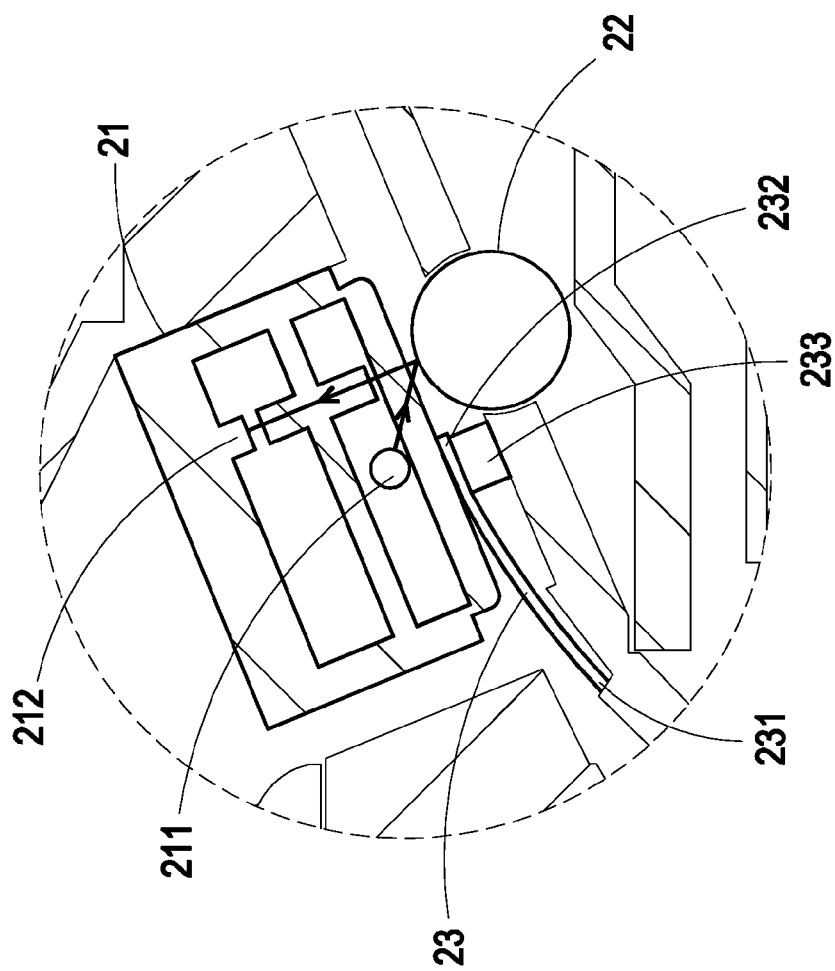
FIG. 3 is a partial enlarged view illustrating another exemplary first image sensor used in the image reading apparatus of the present invention.

FIG. 3 is a partial enlarged view illustrating another exemplary first image sensor used in the image reading apparatus of the present invention. The first optical module 21 and the first correction element 22 included in the first image sensor 20 are identical to those shown in FIG. 2, and are redundantly described herein. In this embodiment, the first end 231 of the elastic sustaining element 23 is fixed under the transfer path but an elastomeric article 233 is disposed on the bottom of the second end 232 of the elastic sustaining element 23. An example of the elastomeric article 223 includes but is not limited to a foam pad or a rubbery pad. The use of the elastomeric article 223 could facilitate the second end 232 of the elastic sustaining element 23 to be upwardly sustained against the glass surface 213 of the first optical module 21. As a consequence, the document will be in close contact with the glass surface 213.

Due to the thickness and weight of the document or the tension exerted by the transfer rollers (not shown) in the transfer path, the elastic sustaining element 23 may be moved downwardly. For preventing contact between the elastic sustaining element 23 and the first correction element 22, the length of the elastic sustaining element 23 should be taken into consideration. Since no friction is generated between the elastic sustaining element 23 and the first correction element 22, the first correction element 22 will not be damaged and the correcting efficacy is enhanced.

Since the first correction element 22 is very close to the glass surface 213 of the first optical module 21, the compensated correction position of the image reading apparatus is substantially the same as the real scanning position. In other words, the distortion correction problem will be overcome and thus the scanning quality is enhanced. In addition, since the elastic force offered by the elastic sustaining element 23 will suppress the document to be in close contact with the glass surface 213, the possibility of abrading or contaminating the first correction element 22 will be minimized. The rotating speed of the first correction element 22 is equal to a transmitting speed of the original document. Since no relative friction is generated between the document and the first correction element 22, the first correction element 22 is not scraped and the distortion correction problem is overcome.

Figure 4:
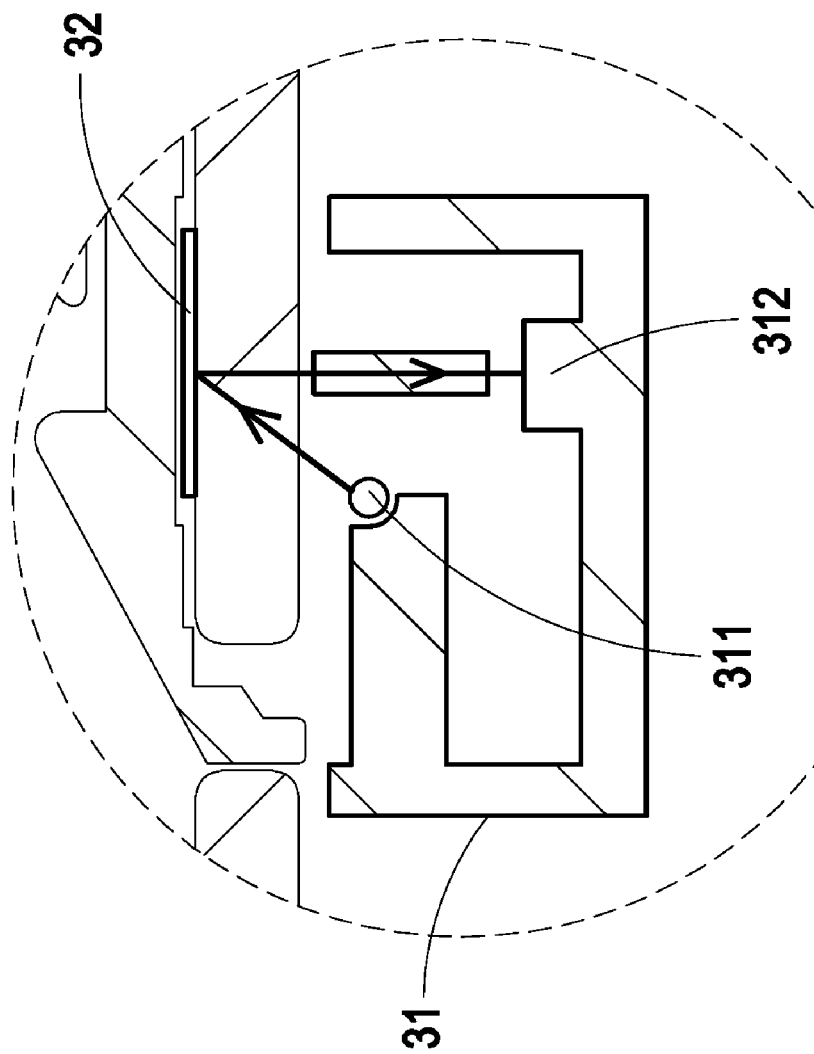
FIG. 4 is a partial enlarged view illustrating an exemplary second image sensor used in the image reading apparatus of the present invention.

FIG. 4 is a partial enlarged view illustrating an exemplary second image sensor used in the image reading apparatus of the present invention. As shown in FIG. 4, the second image sensor 30 comprises a second optical module 31 and a second correction element 32. The second optical module 31 includes a second light source 311 and a second light-sensing element 312. The second light source 311 is used for emitting a light beam required for performing the scanning operation. The light beam is successively reflected by the plural reflective mirrors (not shown) and then imaged onto the second light-sensing element 312. By the second light-sensing element 312, the optical signal of the reflective light beam is converted into a corresponding image signal. An example of the second light-sensing element 312 includes but is not limited to a contact image sensor (CIS) or a charge coupled device (CCD). In some embodiments, the second optical module 31 further includes multiple reflective mirrors and a lens (not shown). The light beam is successively reflected by the plural reflective mirrors, focused by the lens, and then imaged onto the second light-sensing element 312.

For enhancing the scanning quality, before the image reading apparatus 10 reads out data, the image reading apparatus 10 should be corrected according to background condition and the light-sensing element. The correction includes for example brightness correction, hue correction, contrast correction, and the like. After the correction is implemented, the optical parameters of the light-sensing element will be compensated. As shown in FIG 4, the second correction element 32 of the second image sensor 30 is a correction plate, which is arranged at an opposite side of the second optical module 31. The light beam emitted by the second light source 311 is reflected by the second correction element 32, and then received by the second light-sensing element 312. By the second light-sensing element 312, the optical signal of the reflective light beam is processed into a standard value of an image signal. The standard value is used for compensating the color hue and brightness of the image data obtained from the scanning operation.

In some embodiments, the second image sensor 30 could be designed as a movable image sensor. The movable image sensor could be moved along a gliding rack of the office machine main body 40 in order to obtain multiple reading lines and enhance the correcting efficacy.

The above embodiments are illustrated by referring to a duplex office machine having two image sensors 20 and 30. Nevertheless, the concept of the present invention could be applied to an office machine having a single image sensor so as to enhance the correcting efficacy.

The present invention also provides an image sensor of an image reading apparatus. The image sensor is mounted on an automatic document feeder 50 of an office machine 1 for sensing and reading data of an original document. The image sensor 20 comprises an optical module 21, a correction roller 22 and an elastic sustaining element 23. The optical module 21 includes a light source 211, a light-sensing element 212 and a glass surface 213. The correction roller 22 is arranged at an opposite side of the optical module 21. A first end 231 (or a fixed end) of the elastic sustaining element 23 is fixed under the transfer path. A second end 232 (or a free end) of the elastic sustaining element 23 is naturally uplifted to be sustained against the glass surface 213 of the optical module 21. The configurations of the image sensor 20 have been illustrated in FIG. 3, and are not redundantly described herein.

From the above description, the image reading apparatus of the present invention includes a first image sensor and a second image sensor. The first image sensor and the second image sensor are respectively disposed in the automatic document feeder and the office machine main body for scanning the front and back sides of the original document. The first image sensor has a cylindrical roller as a correction element. The rotating speed of the cylindrical roller is equal to a transmitting speed of the original document. The first image sensor further includes an elastic sustaining element. The elastic sustaining element has a fixed end and a free end. The free end is sustained against the glass surface of the first optical module, thereby facilitating a close contact between the document and the glass surface. In addition, since the cylindrical roller is still separated from the glass surface of the first optical module by a gap, the possibility of abrading or contaminating the cylindrical roller will be minimized. Since no relative friction is generated between the document and the cylindrical roller, the cylindrical roller is not scraped and the distortion correction problem is overcome. In comparison with the prior art, the image reading apparatus of the present invention has enhanced scanning quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image reading apparatus for use in an office machine, said office machine comprising an office machine main body and an automatic document feeder, said image reading apparatus comprising:

a first image sensor disposed in said automatic document feeder for sensing and reading a first side of a document, said first image sensor comprising:
a first optical module comprising a first light source, a first light-sensing element and a glass surface;
a first correction element arranged at an opposite side of said first optical module; and
an elastic sustaining element having a fixed end and a free end, wherein said elastic sustaining element is an elastic sheet, said elastic sustaining element and said first optical module are respectively disposed on opposite sides of said document, said free end is sustained against said glass surface of said first optical module, thereby facilitating a close contact between said document and said glass surface; and a second image sensor disposed in said office machine main body for sensing and reading a second side of said document.

2. The image reading apparatus according to claim 1 wherein said first light-sensing element is a contact image sensor or a charge coupled device.

3. The image reading apparatus according to claim 1 wherein said first correction element is a cylindrical roller.

4. The image reading apparatus according to claim 3 wherein said cylindrical roller is a white cylindrical roller.

5. The image reading apparatus according to claim 1 wherein a rotating speed of said first correction element is equal to a transmitting speed of said document.

6. The image reading apparatus according to claim 1 wherein said first correction element is separated from said glass surface of said first optical module by a gap.

7. The image reading apparatus according to claim 1 wherein said elastic sustaining element is arranged in upstream of said first correction element along a transfer path of said document, and said fixed end of said elastic sustaining element is fixed under said transfer path.

8. The image reading apparatus according to claim 1 wherein an elastomeric article is disposed on a bottom of said free end of said elastic sustaining element for facilitating said free end to be upwardly sustained against said glass surface of said first optical module.

9. The image reading apparatus according to claim 8 wherein said elastomeric article is a foam pad or a rubbery pad.

10. The image reading apparatus according to claim 1 wherein said second image sensor includes a second optical module and a second correction element, wherein said second optical module includes a second light source and a second light-sensing element, and said second correction element is a correction plate.

11. The image reading apparatus according to claim 10 wherein said second light-sensing element is a contact image sensor or a charge coupled device.

12. An image sensor of an image reading apparatus of an office machine for sensing and reading a document, said image sensor comprising:
 an optical module comprising a light source, a light-sensing element and a glass surface;
 a correction roller arranged at an opposite side of said optical module; and
 an elastic sustaining element having a fixed end and a free end, wherein said elastic sustaining element is an elastic sheet, said elastic sustaining element and said first optical module are respectively disposed on opposite sides of said document, said free end is sustained against said glass surface of said optical module, thereby facilitating a close contact between said document and said glass surface.

13. The image sensor according to claim 12 wherein said light-sensing element is a contact image sensor.

14. The image sensor according to claim 12 wherein a rotating speed of said correction roller is equal to a transmitting speed of said document.

15. The image sensor according to claim 12 wherein said correction roller is separated from said glass surface of said optical module by a gap.

16. The image sensor according to claim 12 wherein said elastic sustaining element is arranged in upstream of said correction element along a transfer path of said document, and said fixed end of said elastic sustaining element is fixed under said transfer path.

17. The image sensor according to claim 12 wherein an elastomeric article is disposed on a bottom of said free end of said elastic sustaining element for facilitating said free end to be upwardly sustained against said glass surface of said optical module.

18. The image sensor according to claim 17 wherein said elastomeric article is a foam pad or a rubbery pad.

* * * * *